United States Patent
Carter

(10) Patent No.: US 7,436,161 B2
(45) Date of Patent: Oct. 14, 2008

(54) CIRCUIT AND METHOD FOR REDUCING THE SIZE AND COST OF SWITCH MODE POWER SUPPLIES

(75) Inventor: Michael Carter, Clayton, NC (US)

(73) Assignee: ADC DSL Systems, Inc., Eden Prairie, MN (US)

(*) Notice: Subject to any disclaimer, the term of this patent is extended or adjusted under 35 U.S.C. 154(b) by 446 days.

(21) Appl. No.: 11/111,138

(22) Filed: Apr. 21, 2005

(65) Prior Publication Data

US 2006/0239048 A1    Oct. 26, 2006

(51) Int. Cl.
*G05F 1/40* (2006.01)

(52) U.S. Cl. .................. 323/284; 323/251

(58) Field of Classification Search .......... 323/220, 323/223, 282, 284, 351; 361/18
See application file for complete search history.

(56) References Cited

U.S. PATENT DOCUMENTS

| | | | |
|---|---|---|---|
| 6,885,530 B2* | 4/2005 | Wenzel | 361/18 |
| 6,958,643 B2* | 10/2005 | Rosenthal | 327/540 |
| 7,102,860 B2* | 9/2006 | Wenzel | 361/18 |

* cited by examiner

*Primary Examiner*—Jessica Han
(74) *Attorney, Agent, or Firm*—Fogg & Powers LLC

(57) ABSTRACT

An improved circuit and method for decreasing the size and cost of switch mode power supplies is disclosed. In one illustrative example, a feedback circuit for a switch mode power supply is disclosed that includes two error amplifiers. The input of a first error amplifier is coupled to a voltage source associated with a load for the supply, and the input of a second error amplifier is coupled to a current source also associated with the load for the supply. Each one of the error amplifiers includes an adjustable shunt regulator that functions as an amplifier stage and diode. Also, the outputs of the shunt regulators are connected together. Therefore, the shunt regulator of the first error amplifier can be used to select a voltage limit for the power supply, the shunt regulator of the second error amplifier can be used to select a current set point for the power supply, and the open collector functions of the shunt regulators serve to OR the output signals from the two error amplifiers to produce a signal indicating the loading of the supply. In this manner, an improved feedback circuit for a switch mode power supply is provided that performs the same functions as prior feedback circuits, but has at least three less discrete components (e.g., two diodes and a voltage reference) than the prior feedback circuits. Thus, the disclosed feedback circuit significantly reduces both the size and cost of switch mode power supplies.

18 Claims, 2 Drawing Sheets

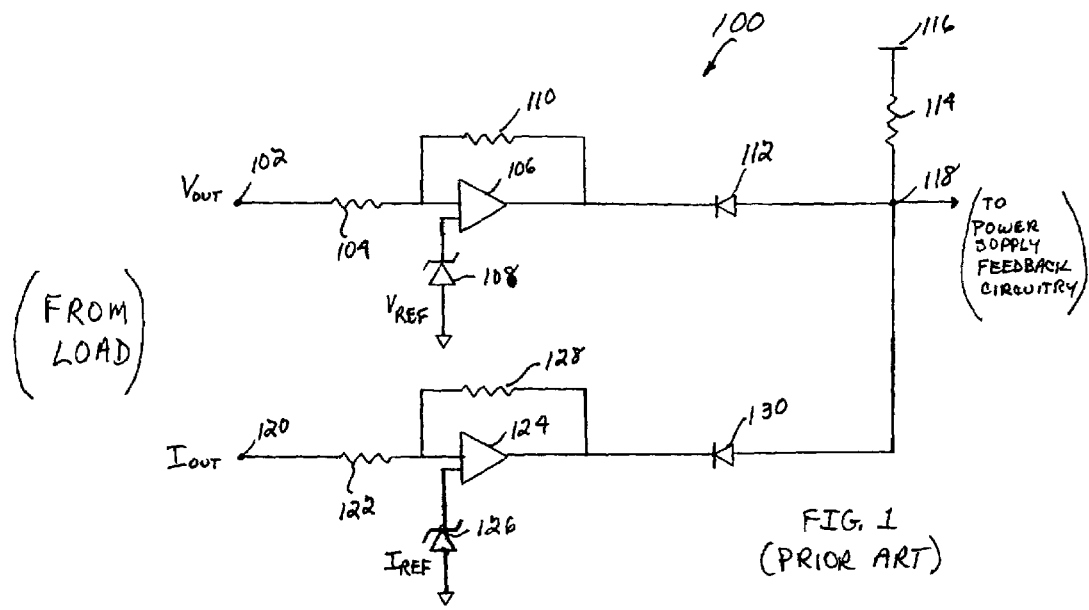
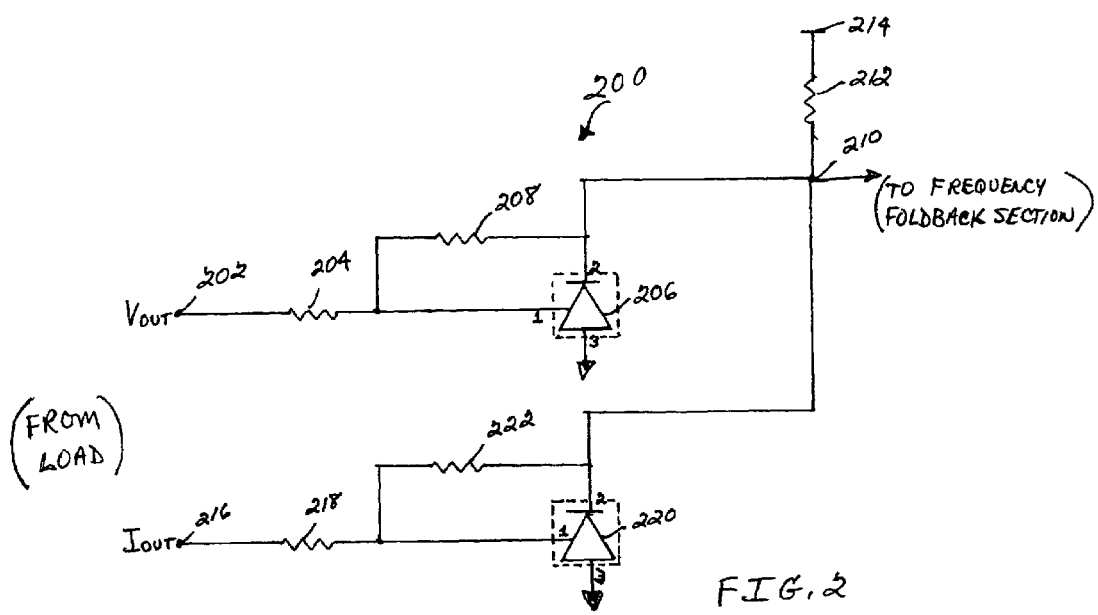

CIRCUIT AND METHOD FOR REDUCING THE SIZE AND COST OF SWITCH MODE POWER SUPPLIES

RELATED APPLICATIONS

The present application is related to commonly assigned and co-pending U.S. patent application Ser. No. 11/111,139 entitled "CIRCUIT AND METHOD FOR INCREASING THE STABILITY OF SWITCH MODE POWER SUPPLIES," filed on the same date as the present application, which is incorporated herein by reference in its entirety.

FIELD OF THE INVENTION

The present invention relates generally to the power supply field, and more specifically, but not exclusively, to a circuit and method for reducing the number of components, and the size and cost of switch mode power supplies.

BACKGROUND OF THE INVENTION

Switch mode power supplies are used in a broad range of electronic applications, such as, for example, telecommunication systems, computers, television equipment, video equipment, etc., where it is important to accurately regulate a power supply output over a wide range of loads. A significant advantage of switch mode power supplies over other types of regulated power supplies (e.g., linear power supplies) is that switch mode power supplies are smaller, weigh less, consume less power, and are highly efficient compared to many other types of regulated power supplies.

In certain applications, a switch mode power supply must act as a current source with over-voltage protection. A conventional voltage source typically shuts down during a short circuit, which leaves only an open circuit as the minimum load condition. As the load on a current source moves towards an open circuit, the power supply attempts to increase the supply voltage in order to reach a predetermined current set point. Consequently, a voltage limit is placed on the supply, so that if the load opens up completely, the supply will be limited at an upper voltage. Otherwise, the output voltage would increase until components begin to fail.

A conventional technique that is used to provide current mode regulation and the voltage limit function in a switch mode power supply operating as a current source is to generate two feedback signals. One of the two feedback signals is controlled by the current set point for the supply, and the second feedback signal is controlled by the voltage limit for the supply. The two feedback signals are OR'd together to produce a signal that indicates the loading of the supply. This OR'd signal (e.g., referred to as a compensation signal) is then used to control the duty cycle of the oscillator and the switching in the switch mode power supply. An example of this feedback signal technique that can be used for controlling the duty cycle of the switching of a power supply is illustrated in FIG. 1.

FIG. 1 depicts an existing feedback circuit 100 that can be used to provide a compensation signal for a switch mode power supply. In typical applications, circuit 100 is commonly used for power supply feedback in a switch mode power supply operating as a current source. As shown, circuit 100 includes a first input connection 102, which is connected to measure the output voltage (e.g., $V_{OUT}$) at the power supply load (not shown). A (load) voltage sensed at connection 102 is developed across resistor 104 and applied to a first input of an amplifier stage (e.g., operational amplifier) 106. A second input of amplifier stage 106 is connected to a reference voltage source 108 (e.g., shunt regulator), which is selected to provide a desired voltage limit for the supply. Resistor 110 is a feedback resistor for amplifier stage 106. Thus, amplifier stage 106 functions essentially as an error amplifier, with the output of amplifier stage 106 increasing as the (scaled) output voltage drops below the reference voltage 108, or decreasing as the (scaled) output voltage rises above the reference voltage 108. The output from amplifier stage 106 is coupled through a diode 112 to a pullup resistor 114. The resistor 114 is connected to a circuit supply 116 and works together with diodes 112 and 130 to "diode-OR" the outputs from the amplifiers together. The resulting signal forms the compensation signal output connect 118.

Circuit 100 also includes a second input connection 120, which is connected to measure the output current (e.g., $I_{OUT}$) delivered to the load (not shown), by reading the voltage developed across a resistor (not shown) in series with the load. The voltage proportional to the (load) current sensed at connection 120 is passed though resistor 122 and applied to a first input of a second amplifier stage (e.g., operational amplifier) 124. A second input of amplifier stage 124 is connected to a reference voltage source 126 (e.g., shunt regulator), which is selected to provide a desired current set point (e.g., 60 ma) for the supply. Notably, although two reference voltage sources (108, 126) are shown in FIG. 1, these two reference voltage sources are typically implemented with one device. Resistor 128 is a feedback resistor for amplifier stage 124. Thus, amplifier stage 124 functions as a second error amplifier, and the output of amplifier stage 124 is set by the difference between the desired reference 126 and the sensed output current 120. The output from amplifier stage 124 is coupled through a diode 130 to a pullup resistor 114. The pullup resistor 114 is connected to a circuit supply 116 and works together with diodes 112 and 130 to "diode-OR" the outputs from the amplifiers 106 and 124 together. The resulting signal forms the compensation signal output connect 118. The diodes 112 and 130 function to OR the output signals from amplifiers 106 and 124, and enables whichever sensed parameter is the highest above its desired reference to control the power supply by way of the feedback circuit 100 this allows the supply to operate with stability in both current regulating and voltage limiting modes.

Notwithstanding the distinct advantages of the existing power supply feedback signal technique that can be used in a switch mode power supply, a significant problem that still exists with such switch mode power supplies is that they are generally more expensive than other regulated power supplies (particularly at the lower power levels), because of the relatively high number and cost of components in the switch mode power supplies and relative complexity of the circuitry involved. Consequently, the bulkier, less accurate, and more inefficient power supplies are often used in cost-sensitive applications. Therefore, it would be advantageous to have a switch mode power supply that can operate efficiently and accurately over a very wide range of loads, and is also much smaller and less expensive than the existing switch mode power supplies. As described in detail below, the present invention provides such a much smaller, less expensive switch mode power supply.

SUMMARY OF THE INVENTION

The present invention provides an improved circuit and method for decreasing the size and cost of switch mode power supplies. In accordance with a preferred embodiment of the present invention, a feedback circuit for a switch mode power supply is provided that includes two error amplifiers. The input of a first error amplifier is coupled to the output voltage across the load of the supply, and the input of a second error amplifier is coupled to a voltage that is proportional to the output current drawn by the load of the supply. Each one of the error amplifiers includes an adjustable shunt regulator device that functions as a voltage reference, amplifier stage and open collector output transistor. Also, the outputs of the shunt regulators are connected together. Therefore, the shunt regulator of the first error amplifier can be used to select a voltage limit for the power supply, the shunt regulator of the second error amplifier can be used to select a current set point for the power supply, and the open collector output transistors of the shunt regulators OR the output signals from the two error amplifiers to produce a signal indicating the loading of the supply. In this manner, the present invention provides an improved feedback circuit for a switch mode power supply that performs the same functions as prior feedback circuits, but has at least three less discrete components (e.g., two diodes and a voltage reference) than the prior feedback circuits. Thus, the present invention significantly reduces both the size and cost of switch mode power supplies.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts an existing circuit that can be used for power supply feedback in a switch mode power supply;

FIG. 2 depicts an improved feedback circuit for a switch mode power supply, which can be used to implement a preferred embodiment of the present invention.

DETAILED DESCRIPTION OF PREFERRED EMBODIMENT

Figure 3:
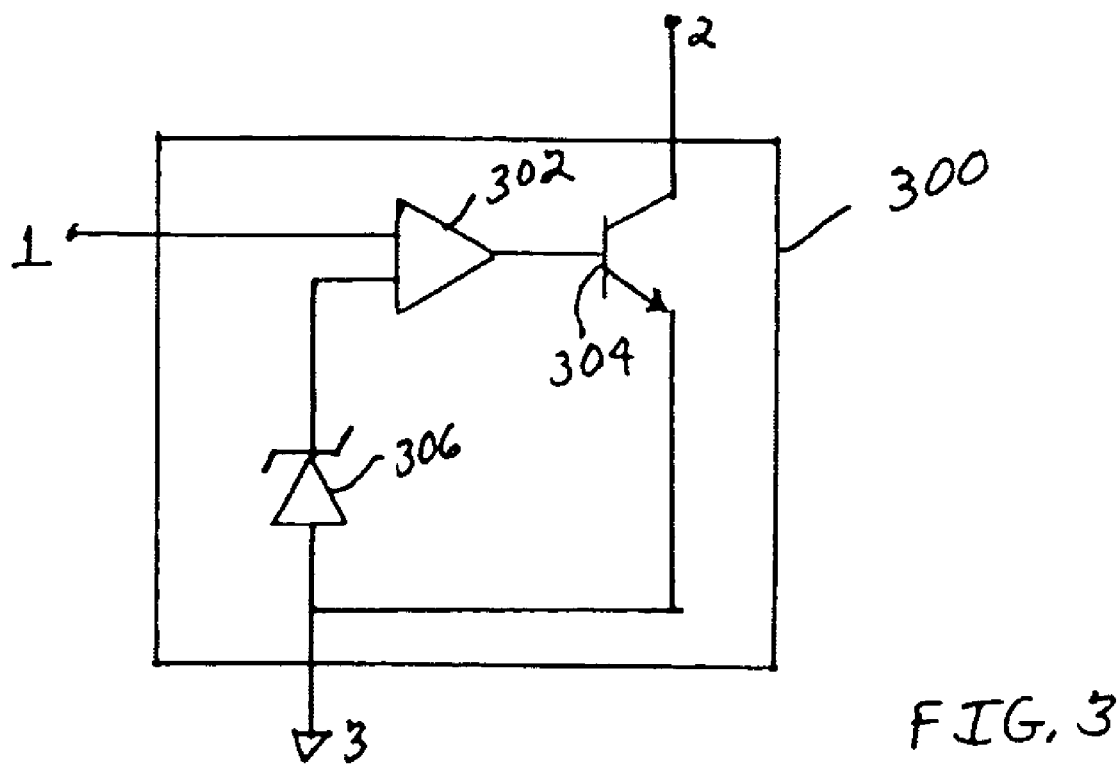
FIG. 3 depicts an example shunt regulator device, which may be used to implement one or more embodiments of the present invention.

With reference now to the figures, FIG. 2 depicts an improved feedback circuit 200 for a switch mode power supply, which can be used to implement a preferred embodiment of the present invention. The compensation signal output from section 200 indicates the loading of the supply and can be used, for example, to perform duty cycle control operations for switch mode power supplies in high technology applications, such as for example, in Simplex Span Powered T1 power supply applications. As shown, feedback circuit 200 includes a first input connection 202, which is coupled to a voltage source (e.g., $V_{OUT}$) across a power supply load (not shown). A (load) voltage sensed at connection 202 is developed across resistor 204 and applied to a first input terminal (1) of a shunt regulator device 206. For this embodiment, a detailed view of an example shunt regulator device that can be used to implement shunt regulator device 206, is shown in, and described below with respect to, FIG. 3.

FIG. 3 depicts an example shunt regulator device 300, which may be used to implement one or more embodiments of the present invention. For this example embodiment, shunt regulator device 300 includes an amplifier (e.g., operational amplifier) 302. One input of amplifier 302 is connected to a first terminal (1) of shunt regulator device 300, and the second input of amplifier 302 is connected to one side of a voltage reference diode 306. The second side of diode 306 is connected to a third terminal (3) of shunt regulator device 300, and an emitter of a transistor 304. The base of transistor 304 is connected to the output of amplifier 302, and the collector of transistor 304 is connected to a second terminal (2) of shunt regulator device 300. As such, diode 306 can function to set a voltage reference or current reference for amplifier 302, and can be used to select a voltage limit or current set point, respectively, at the output of amplifier 302. Transistor 304 functions as a diode to pass or block current flow to/from the output of amplifier 302 via the collector of transistor 304 and the output terminal (3) of shunt regulator device 300. As such, this function of transistor 304 is similar to the function of diode 112 or 130 in FIG. 1. Notably, although shunt regulator device 300 is depicted for this example embodiment with particular components and a particular structural arrangement, the present invention is not intended to be so limited, and can include any suitable, single device capable of performing the functions of the error amplifiers and diodes described above with respect to FIG. 1. For example, shunt regulator device 300 can be implemented with a three-terminal TL431 Programmable Shunt Regulator manufactured by Fairchild Semiconductor Corporation.

Referring now to FIGS. 2 and 3, for this example embodiment, the second side of resistor 204 is connected via terminal (1) to the first input of amplifier 302. The second input of amplifier 302 is connected to a voltage reference diode 306, which is selected to provide a desired voltage limit (e.g., 2.5V) for the supply. The other side of diode 306 is connected to circuit "ground". Resistor 208 is a feedback resistor for shunt regulator device 206. Thus, amplifier 302 and voltage reference diode 306 can function as an error amplifier, and the output of amplifier 302 is limited by voltage reference diode 306. The output current from amplifier 302 is coupled through the collector of transistor 304 and terminal (2) of shunt regulator device 206 to a compensation signal output connection 210, and an output voltage from shunt regulator device 300 is developed across resistor 212. One side of resistor 212 is connected to a circuit supply 214, and the other side of resistor 212 is connected to compensation signal output connection 210.

Feedback circuit 200 also includes a second input connection 216, which is coupled to a voltage developed across a sense resistor which is proportional to the output current (e.g., $I_{OUT}$) drawn by the power supply load (not shown). The voltage sensed at connection 216 is developed across resistor 218 and applied to a first input terminal (1) of a second shunt regulator device 220, which is connected to a first input of a second amplifier (e.g., amplifier 302 in FIG. 3). Referring again to FIGS. 2 and 3, for this example embodiment, a second input of amplifier stage 302 is connected, in this case, to a voltage reference diode 306, which is selected to provide a desired current set point (e.g., 60 ma) for the supply. Resistor 222 is a feedback resistor for shunt regulator device 220. Thus, amplifier 302 and voltage reference diode 306 used in shunt regulator 220 can function as a second error amplifier, and the output of amplifier 302 is limited to the desired set point by voltage reference diode 306. The output current from amplifier 302 is coupled through the collector of transistor 304 and terminal (2) of shunt regulator device 220 to compensation signal output connection 210, and an output voltage from amplifier stage 302 of shunt regulator device 220 is developed across resistor 212. Again, one side of resistor 212 is connected to circuit supply 214, and the other side of resistor 212 is connected to compensation signal output connection 210. Thus, the transistors 304 in shunt regulator devices 206 and 220 function to OR the output signals from the shunt regulator devices 206 and 220, which enables feedback circuit 200 to produce an output signal that indicates the loading of the supply (e.g., ranging from a short to an open load). Importantly, however, in accordance with the principles of the present invention, the functions of feedback circuit 200 are performed with at least three less discrete components (e.g., diodes 112 and 130 and voltage reference 108 in FIG. 1) than prior feedback circuits of switch mode power supplies. Consequently, the present invention provides a circuit and method that reduces the number of components, saves space on circuit boards, and significantly reduces the costs of switch mode power supplies.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A feedback circuit for a switch mode power supply, comprising:
    a first signal feedback stage, an input of said first signal feedback stage coupled to a load of the switch mode power supply, wherein the first signal feedback stage comprises:
    a first amplifier, a first input of said first amplifier coupled to said load;
    a first reference device, a first connection of said first reference device connected to a second input of said first amplifier, said first reference device operable to select a reference voltage level as a comparison level for a signal sensed at said first input of said first amplifier; and
    a first transistor device, a base of said first transistor device connected to an output of said first amplifier, an emitter of said first transistor device connected to a second connection of said first reference device, and a collector of said first transistor device coupled to an output of said first signal feedback stage, said first transistor device operable to pass or block current flow from or to said output of said first amplifier and said output of said first signal feedback stage; and
    a second signal feedback stage, an input of said second signal feedback stage coupled to said load of the switch mode power supply, and an output of said second signal feedback stage coupled to said output of said first signal feedback stage, wherein said second signal feedback stage comprises:
    a second amplifier, a first input of said second amplifier coupled to said load;
    a second reference device coupled to a second input of said second amplifier, a first connection of said second reference device connected to a second input of said second amplifier, said second reference device operable to select a reference current level as a comparison level for a signal sensed at said first input of said second amplifier; and
    a second transistor device, a base of said second transistor device connected to an output of said second amplifier, an emitter of said second transistor device connected to a second connection of said second reference device, and a collector of said second transistor coupled to said output of said second signal feedback stage, said second transistor device operable to pass or block current flow from or to said output of said second amplifier and said output of said second signal feedback stage.

2. The feedback circuit of claim 1, wherein said load comprises at least one of a current source and a voltage source.

3. The feedback circuit of claim 1, wherein each of said first signal feedback stage and said second signal feedback stage comprises a single device.

4. The feedback circuit of claim 1, wherein each of said first signal feedback stage and said second signal feedback stage comprises an adjustable shunt regulator device.

5. The feedback circuit of claim 1, wherein each of said first signal feedback stage and said second signal feedback stage comprises a TL431 shunt regulator.

6. The feedback circuit of claim 1, wherein each of said first signal feedback stage and said second signal feedback stage comprises a voltage feedback signal stage.

7. The feedback circuit of claim 1, wherein said output of said second signal feedback stage coupled to said output of said first signal feedback stage comprises an OR'd output.

8. A signal feedback circuit for a switch mode power supply, comprising:
    means for amplifying, a first input of said means for amplifying coupled to a current source associated with a load for said switch mode power supply;
    means for regulating a current sensed at said first input of said means for amplifying to a predetermined current level, a first connection of said means for regulating connected to a second input of said means for amplifying; and
    transistor means for passing or blocking flow of said regulated current from or to an output of said means for amplifying, wherein a base of said transistor means is connected to said output of said means for amplifying, an emitter of said transistor means is connected to a second connection of said means for regulating, and a collector of said transistor means is coupled to an output of said signal feedback circuit.

9. The signal feedback circuit of claim 8, wherein said means for amplifying, said means for regulating, and said transistor means for passing or blocking flow comprise a single device.

10. The signal feedback circuit of claim 9, wherein said single device comprises a TL431 shunt regulator device.

11. The signal feedback circuit of claim 8, wherein said means for regulating comprises a diode device.

12. A method for producing a compensation signal input for a switch mode power supply, comprising the steps of:
    coupling an input of a first signal feedback stage to a load of the switch mode power supply;
    coupling an input of a second signal feedback stage to said load of the switch mode power supply;
    coupling an output of said second signal feedback stage to an output of said first signal feedback stage, and with respect to at least one signal feedback stage of said first signal feedback stage and said second signal feedback stage:
    coupling a first input of an amplifier of said at least one signal feedback stage to said load;
    connecting a first connection of a reference device of said at least one signal feedback stage to a second input of said amplifier;
    sensing a signal at said first input of said amplifier;
    selecting, for said reference device, at least one of a reference voltage level and a reference current level as a comparison level for said signal sensed at said first input of said amplifier;

connecting a base of a transistor device of said at least one signal feedback stage to an output of said amplifier, connecting an emitter of said transistor device to a second connection of said reference device, coupling a collector of said transistor device to an output of said at least one signal feedback stage, and said transistor device passing or blocking current flow from or to said output of said amplifier and said output of said at least one signal feedback stage.

13. The method of claim 12, wherein said load comprises at least one of a current source and a voltage source.

14. The method of claim 12, wherein said at least one signal feedback stage comprises a single device.

15. The method of claim 12, wherein said at least one signal feedback stage comprises an adjustable shunt regulator device.

16. The method of claim 12, wherein said at least one signal feedback stage comprises a TL431 shunt regulator.

17. The method of claim 12, wherein said first signal feedback stage comprises a voltage feedback signal stage, and said second signal feedback stage comprises a current feedback signal stage.

18. The method of claim 12, wherein the step of coupling said output of said second signal feedback stage to said output of said first signal feedback stage further comprises a step of OR'ing said output of said first signal feedback stage and said output of said second signal feedback stage.

* * * * *